Figure 1:
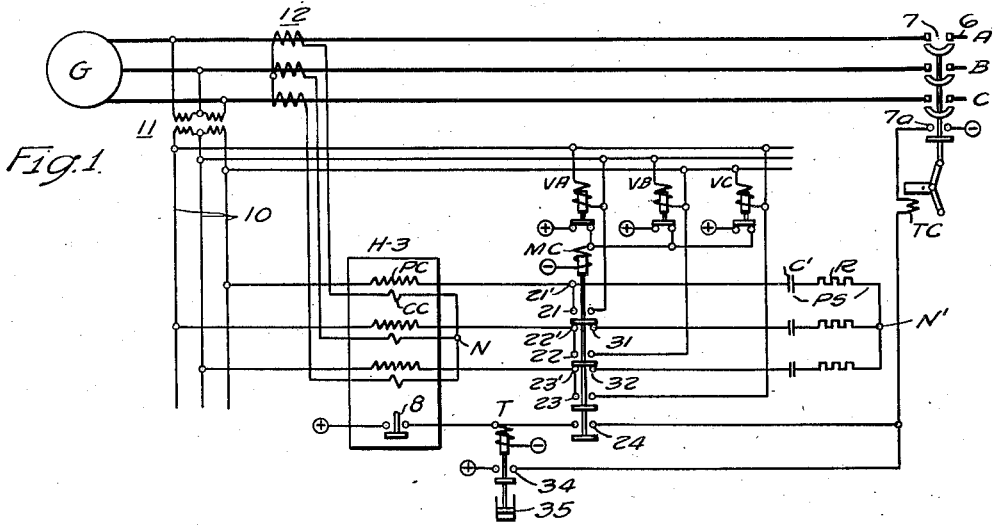

May 22, 1945.     L. L. FOUNTAIN     2,376,766
POWER-REVERSAL AND FAULT-RESPONSIVE RELAY

Filed Nov. 20, 1943

WITNESSES:
E. A. McCloskey.
New. C. Groome

INVENTOR
Lawrence L. Fountain.
BY O. D. Buchanan
ATTORNEY

Patented May 22, 1945

2,376,766

UNITED STATES PATENT OFFICE 2,376,766

POWER-REVERSAL AND FAULT-RESPONSIVE RELAY

Lawrence L. Fountain, Wilkinsburg, Pa., assignor to Westinghouse Electric & Manufacturing Company, East Pittsburgh, Pa., a corporation of Pennsylvania Application November 20, 1943, Serial No. 511,042

8 Claims. (Cl. 175—294)

My present invention relates to a method and means for protecting an alternating-current against motoring or power-reversal, and also against internal faults within the generator.

If a generator is connected to a system on which there are other sources, and its prime mover should fail to deliver torque to its shaft, then a motoring condition would exist. This would be accompanied by a reversal of power-flow at the terminals of the generator. This motoring condition of the generator is usually detected, and guarded against, by a reverse-power-flow relay which is sensitive to the direction of power-flow. In order to function properly, such a relay must be sensitive only to watts, so that it has its maximum response when the generator-current is at approximately unity power-factor in the motoring direction.

Such a reverse-power relay, being sensitive only to watts, would not reliably respond to reverse-current conditions which are caused by faults within the generator, because such fault-currents have a power-factor which is usually quite low, which means that the relay-torque is reduced in proportion to the cosine of the angle of lag between the current and the voltage, which may approach a 90-degree angle, having a cosine of zero. This has necessitated the utilization of another relay, separate from the motoring-detecting relay, for protecting the generator against internal faults.

It is an object of my invention to provide a dual-purpose relay which can be depended upon to close its contacts for both motoring and fault-conditions.

More specifically, it is an object of my invention to combine, with an alternating-current watt-type power-direction relay, a fault-responsive relay-means for changing the energization from approximately unity-power-factor response to a lagging-power-factor response of the power direction relay, in response to a predetermined line-fault condition.

A further object of my invention is to utilize a dual-purpose relay of the kind just mentioned, in a relaying system in which a time-delay relay is energized in response to the power-direction relay, and in which a relaying operation is delayedly performed in response to the time-delay relay, and a relaying operation is immediately performed in response to a joint response of the directional relay and the fault-responsive relay.

Figure 2:
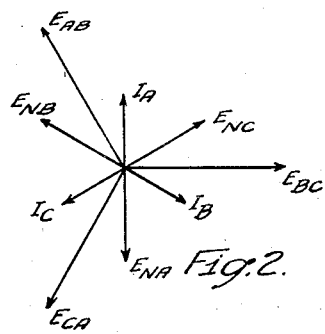
Figure 3:
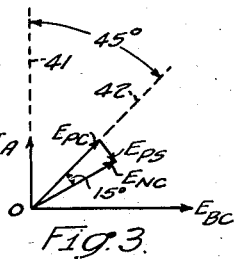
Figure 4:
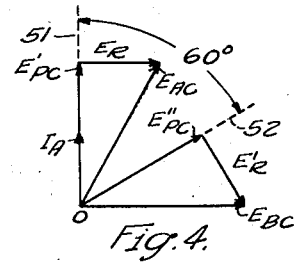
Figure 5:
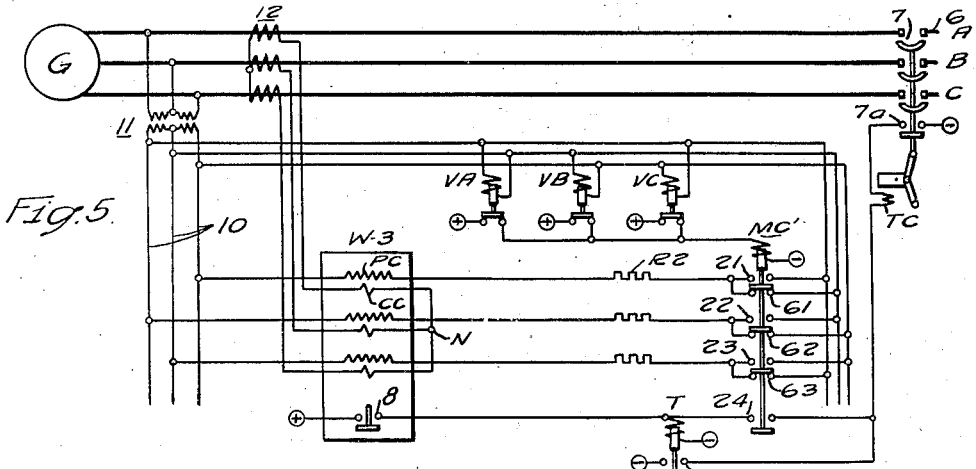

With the foregoing and other objects in view, my invention consists in the apparatus, parts, combinations, methods, and systems hereinafter described and claimed, and illustrated in the accompanying drawing, wherein:

Figure 1 is a diagrammatic view of circuits and apparatus embodying my invention, Figs. 2, 3 and 4 are vector-diagrams which will be referred to in the explanation of my invention, and Fig. 5 is a view similar to Fig. 1, showing a modification.

As shown in Fig. 1, my invention is utilized in the protection of a three-phase generator G, which is connected to a three-phase line or system 6 through a circuit-breaker 7. The conditions are normally such that power flows from the generator G to the system 6, but this power-flow is subject to reversal, either upon a failure of the prime mover (not shown) to deliver torque to the generator, or upon the occurrence of a fault within the generator. The circuit-breaker 7 is provided with a trip-coil TC, and with an auxiliary switch 7a which opens when the main contacts open.

To protect the generator G, as shown in Fig. 1, I provide a three-phase directional relay H—3 having a normally open contact 8, and three sets of single-phase torque-producing elements, each having a potential-coil PC and a current-coil CC paired together. The three potential-coils PC are energized from the several phases of a three-phase relaying-bus 10 which is energized from a potential-transformer 11 connected to the generator-terminals or line 6. The three current-coils CC are energized responsively to the several phases of the generator-currents through a line-current transformer 12.

The directional relay which is shown in Fig. 1 is of a type which develops its maximum torque, in each phase, when the current in the current-coil leads the voltage which is effective across the potential-coil, by 45°. Such a relay is shown in a Goldsborough and Hoard Patent 2,300,886, and in a Hoard Patent 2,301,162, both issued November 3, 1942, and both assigned to the Westinghouse Electric & Manufacturing Company.

To make the relay H—3 deliver its maximum torque at unity power-factor, the three current-coils are energized responsively to the three star-phases of the line-current, while the corresponding potential-coils are each energized from the star-voltage which lags 60 degrees behind the corresponding current at unity power-factor, but the potential-coil circuits each include a phase-shifter PS, comprising a serially connected capacitor C' and resistor R, for advancing the voltage-phase by 15 degrees. Thus, the three current-coils CC are connected in star, to a neutral-point N, while the three voltage-coils PC are connected in star, through the three phase-shifters PS, to a neutral-point N'.

In accordance with my invention as further shown in Fig. 1, I provide a fault-detector means for responding to faults on the line 6, or to faults on or in the generator G. By way of illustration, I have shown a simple form of fault-detector comprising three undervoltage relays VA, VB and VC, having their contacts connected in parallel to energize a master-contactor MC having four make-contacts 21, 22, 23 and 24, and two back-contacts 31 and 32. The two back-contacts 31 and 32 are connected in two of the phases of the star-circuits of the potential-coils PC, to interrupt this star-circuit connection in response to a fault on the line.

The first three make-contacts 21, 22 and 23 of the master-contactor MC each have one of its terminals connected to the corresponding potential-coil terminals 21', 22', or 23', which is connected to the phase-shifter PS in the star-point connection, while the other terminals of the contacts 21, 22 and 23 are connected to the appropriate phase of the voltage-responsive relaying-bus 10 so as to energize each potential-coil PC from the delta voltage-phase which lags the corresponding current-phase by 90 degrees at unity power-factor. The phase-shifters PS are thus not included in the delta-voltage connections of the potential-coils PC.

The fourth make-contact 24 of the master-contactor MC is connected in series with the directional-relay contact 8 of the H—3 relay, to instantaneously energize a trip-circuit to the trip-coil TC, without any time-delay other than is inherent in the necessary operating-time of the master-contactor MC, which is sufficient to enable the H—3 relay to properly respond to its changed energizing-connections as a result of the fault-response of one of the fault-responsive relays VA, VB, or VC. To this end, it may be desirable to adjust the contact 24 to have a longer travel than the contacts 21, 22 and 23, so that the contact 24 will be the last to close. The trip-circuit of the trip-coil TC is completed through the auxiliary switch 7a of the circuit-breaker 7.

To respond to the power-reversal relay H—3 when there is no fault on the system (other than the prime-mover failure of the generator G), I provide a time-delayed tripping circuit through a timer-relay T which is energized directly from the directional-relay contact 8 of the H—3 relay. The timer-relay T has a contact 34 which energizes the tripping circuit of the trip-coil TC, after a time-delay which is symbolized by a dashpot 35.

The operation of the system shown in Fig. 1 will best be understood by reference to Figs. 2 and 3. Fig. 2 shows the three star-current phases $I_A$, $I_B$ and $I_C$ which traverse the three current-coils CC, corresponding to the three phases A, B and C of the line 6 in Fig. 1. Fig. 2 also shows the corresponding star-voltages $E_{NA}$, $E_{NB}$ and $E_{NC}$ and the corresponding delta-voltages $E_{AB}$, $E_{BC}$ and $E_{CA}$ at unity power-factor.

Fig. 3 shows the vector relationships for the phase-A torque-producing element, or pair PC—CC, of the directional relay H—3, under unity-power-factor conditions. The star line-voltage $E_{NC}$ is applied to the potential-coil PC through a phase-shifter PS that shifts the phase 15 degrees in the leading direction, without changing the magnitude of the voltage. The phase-shifter voltage is shown at $E_{PS}$, and the voltage across the potential-coil is shown at $E_{PC}$. Since the star-voltage $E_{NC}$ lags the star-current $I_A$ of the current-coil CC by 60 degrees at unity power-factor, the potential-coil voltage $E_{PC}$ lags the current $I_A$ by 45 degrees at unity power-factor. As previously stated, however, the characteristics of the relay H—3 are such that its maximum torque line is 45 degrees in advance of its potential-coil voltage $E_{PC}$, as indicated by the dotted line 41. It will thus be evident that the current in the current-coil is in phase with the maximum-torque line 41 at unity power-factor, so that the relay H—3 develops its maximum torque at unity power-factor, when its potential-coil has a star-voltage energization, with a phase-shifter, as just described.

When the MC relay changes the potential-coil energization, the delta line-voltage $E_{BC}$ is applied to the potential-coil PC without any phase-shifter. The maximum-torque line of the relay H—3 shifts to a position 42 which is 45 degrees in advance of the new potential-coil voltage $E_{BC}$, and this new maximum-torque line is thus 45 degrees behind the former maximum-torque line 41. Hence the line-current must lag 45 degrees behind its unity-power-factor position $I_A$ in order for the directional relay H—3 to develop its maximum torque.

In operation, the generator G normally delivers power to the line 6, and the directional relay H—3 generates a negative, or restraining, torque which holds the relay in its non-responsive condition. Upon failure of the prime-mover (not shown) to deliver torque to the generator G, the generator-current reverses, and power is fed from the line or system 6 into the generator, in a motoring direction, and the directional relay H—3 responds, as previously explained. This energizes the timer-relay T, which trips the circuit-breaker 7 and disconnects the generator from the line, after a time-delay which is sufficient to prevent undesirable disconnecting-operations as a result of transient conditions.

If a fault should occur on the system, it is necessary to discriminate between an internal fault in the generator G, in which case the fault-current is flowing from the line 6 into the generator G, and an external fault, not in the generator but out on the line somewhere else, in which case the fault-current will be flowing from the generator G into the line 6. In particular, it is necessary to obtain a response to a generator-fault, and to quickly trip the circuit-breaker 7 in such an event. But a generator fault will, in general, have a low power-factor, with a phase-angle of at least 45 or 60 degrees, and sometimes close to 90 degrees, between the current and the voltage in the faulted phase, with the current lagging the voltage.

The directional relay H—3, however, develops a torque, in each phase, proportional to the product of the pair of relaying quantities (current and voltage) which are utilized to energize the current-coil and the potential-coil of that torque-producing phase-element, times a function of the angle between said pair of relaying quantities. Specifically, each phase-element of the three-phase directional relay H—3 produces a torque which varies as the cosine of the angle between the current in the current-winding and the maximum-torque line of that element. At a low-power-factor fault-current, a watt-responsive reverse-power relay, such as the H—3 relay in its normal condition of energization, will develop very little torque in response to that type of reverse-current which results from a fault within the generator.

For this reason, I utilize a suitable fault-detector, such as the three undervoltage relays VA, VB, VC, at least one of which responds to the voltage-dip which accompanies any fault, and energizes the MC contactor which changes the phase-relations between the fluxes and currents in the respective current-coils and their paired or corresponding potential-coils so that the relay now has its maximum response to currents of 45 degrees lagging power-factor. Hence, even if the generator fault-current has a zero power-factor, the relay H—3 will have at least a 70 per-cent response (cos 45°) on the basis of 100 per-cent for the maximum response.

It will be noted that the voltage which is applied to the H—3 potential-coils during fault-conditions is 41 per-cent higher than the voltage which is normally applied during non-faulted conditions, and hence the relay is more sensitive under fault-conditions, so as to be more responsive to weak fault-currents, which is an advantage in a relay in which saturation-conditions are not too objectionable. Since the fault-conditions last only for a moment, there is no danger of over-heating the H—3 relay by reason of its increased voltage-energization.

When a fault occurs on or in the generator, therefore, the fault-detectors VA, VB, VC cause the directional relay to respond reliably and quickly to the reversed current-flow of low power-factor, and the auxiliary contact 24 of the MC relay cooperates with the H—3 relay-contact 8 to immediately trip the circuit-breaker 7 without waiting for the timer T to close its contact 34.

My invention is not limited to a directional relay which has its maximum response when the current leads the voltage-coil energization by precisely 45 degrees, or any other specific angle. Neither is it limited to a shift from a star-voltage to a delta-voltage, or vice versa.

Thus, in Fig. 4, I show the vector diagram of phase-A of a directional relay-element which has its maximum-torque position 51 or 52, as the case may be, coincident with the voltage E'PC or E''PC which is applied to the potential-coil. For the unity-power-factor response, I have here indicated the use of the delta-voltage EAC which lags the current IA by 30 degrees at unity power-factor, and I advance the potential-coil voltage E'PC by 30 degrees, with respect to the applied voltage EAC, by utilizing a serially connected resistor R2 (Fig. 5) which introduces the voltage-component ER at approximately right-angles to E'PC. For the lagging-power-factor response, I apply the delta-voltage EBC which lags the current IA by 90 degrees at unity power-factor, with the same phase-advancing resistor which produces a potential-coil voltage E''PC which is 30 degrees in advance of the applied voltage EBC. The resistor-voltage is E'R. It will be apparent that the maximum-response line 52, in phase-coincidence with E''PC, lags the former maximum-response line 51 by 60 degrees, so that the relay will now have its maximum response at a power-factor of the cosine of 60 degrees, lagging.

A protective relay system corresponding to the Fig. 4 vector-diagram is shown in Fig. 5, in which the true-watt three-phase relay W—3 has been substituted for the 45-degree-angle relay H—3, and in which I utilize an auxiliary relay or contactor-switch MC' having three back-contacts 61, 62 and 63, in addition to the four previously described make-contacts 21, 22, 23 and 24. In Fig. 5, the series resistors R2 are utilized in place of the phase-shifters PS of Fig. 1, and the resistors R2 are left in circuit with their corresponding potential-coils PC during both of the conditions of energization of these coils. Thus the three potential-coil circuits, each consisting of a potential coil with its serially connected resistor R2, are changed, by the back-contacts 61, 62, 63, and the front-contacts 21, 22, 23, from the voltage-phases B, C, A, to the voltage-phases A, B, C, respectively, while the unchanged terminals of these potential-coil circuits remain connected to the voltage-phases C, A, B, respectively. Otherwise, Fig. 5 is the same as Fig. 1, and its operation is the same.

While I have illustrated and described my invention in two preferred forms of embodiment, I wish it to be understood that my invention is by no means limited to these precise forms, particularly in its broader aspects. I desire, therefore, that the appended claims shall be accorded the broadest construction consistent with their language.

I claim as my invention:

1. An alternating-current watt-type power-direction relay having a potential-coil, a current-coil, relay contacts responsive to the relative phases of the currents in the potential and current coils, means for at times so energizing the potential-coil and the current-coil from a line-voltage and a line-current respectively, that the relay has its maximum response at approximately unity power-factor, other means for at times so energizing the potential-coil and the current-coil from a line-voltage and a line-current respectively, that the relay has its maximum response at a considerably lagging power-factor with the power flowing in the same direction to which the relay is responsive during the unity-power-factor energization, and fault-responsive relay-means for changing the energization from approximately unity-power-factor response to lagging-power-factor response of the power-direction relay in response to a predetermined line-fault condition.

2. The invention as defined in claim 1, in combination with a time-delay relay, means for causing the time-delay relay to operate in response to the power-direction relay, means for delayedly performing a relaying operation in response to an operation of the time-delay relay, and means for immediately performing a relaying operation in response to a joint response of the power-direction relay and the fault-responsive relay-means.

3. A double-purpose power-reversal and fault-responsive directional relay for a polyphase line, in combination with means for at times responding to and pairing a line-voltage and a line-current for energizing said directional relay in such manner that the relay has its maximum response at approximately unity power-factor, other means for at times pairing a different pair of line-voltage and line-current for energizing said directional relay in such manner that the relay has its maximum response at a considerably lagging power-factor with the power flowing in the same direction to which the relay is responsive during the unity-power-factor energization, and fault-responsive relay-means for charging the energization from approximately unity-power-factor response to lagging-power-factor response of the power-direction relay in response to a predetermined line-fault condition.

4. A double-purpose directionally responsive relaying-means for a polyphase line, comprising polyphase means for deriving plural-phase voltage-responsive relaying quantities from said line, polyphase means for deriving plural-phase current-responsive relaying quantities from said line, means for combining said relaying quantities in a plurality of pairs of a voltage-responsive quantity and a current-responsive quantity in each pair, in such manner as to obtain a force which is responsive to the product of said pair of quantities times a function of the angle between them, said angular function being a maximum at approximately unity power-factor of the line-current, means for obtaining a relay-response to the sum of said plurality of forces resulting from the several pairs of combined relaying quantities, and fault-responsive means for changing the pairings of said voltage-responsive and current-responsive relaying quantities in such manner as to obtain, in each pair, an angularly responsive and product-responsive force which is a maximum at a considerably lagging power-factor with the power flowing in the same direction to which the relaying-means is responsive during the unity-power-factor energization.

5. A three-phase directional relay for a three-phase generator, said directional relay comprising means for obtaining a relaying response to the sum of a plurality of single-phase torque-producing directional elements each producing a torque responsive to the phase-relations between fluxes and currents in a potential-coil and a current-coil, means adapted to apply, at all times, to the several current-coils, different phases of a polyphase relaying quantity which is responsive to the generator-current, means adapted to apply, at times, to the several potential-coils, different phases of a polyphase relaying quantity which is responsive to the generator-voltage, the voltage-responsive phases and the circuits for applying them to the potential-coils being such that the relay-response is a maximum when the generator-currents are at approximately unity power-factor in the motoring direction, other means adapted to apply to the several potential-coils, at other times, other voltage-responsive phases such that the relay-response is a maximum when the generator-currents are considerably lagging, with power flowing into the generator, and fault-responsive means for changing from the first-mentioned to the second-mentioned means for energizing the potential coils.

6. The invention as defined in claim 5, characterized by the voltage-responsive phases applied to the potential-coils by one of said potential-coil energizing-means being delta phases, and the other voltage-responsive phases being star phases with a 30-degree displacement from the corresponding delta phases.

7. The invention as defined in claim 5, characterized by the voltage-responsive phase which is applied by the first-mentioned potential-coil energizing-means corresponding to the star generator-voltage which lags the corresponding generator-current by 60 degrees at unity power-factor, the directional relay having such characteristics that it develops its maximum torque at unity power-factor with such potential-coil energization when the potential-coil circuits include a phase-shifter which advances the voltage of the potential-coil somewhat with respect to said star-voltage, and further characterized by the voltage-responsive phase which is applied by the second-mentioned potential-coil energizing-means corresponding to the delta generator-voltage which lags the corresponding generator-current by 90 degrees as unity power-factor.

8. The invention as defined in claim 5, characterized by the voltage-responsive phase which is applied by the first-mentioned potential-coil energizing-means corresponding to the delta generator-voltage which lags the corresponding generator-current by 30 degrees at unity power-factor, and further characterized by the voltage-responsive phase which is applied by the second-mentioned potential-coil energizing-means corresponding to the delta generator-voltage which lags the corresponding generator-current by 90 degrees at unity power-factor.

LAWRENCE L. FOUNTAIN.